United States Patent
Ha et al.

(10) Patent No.: US 9,620,787 B2
(45) Date of Patent: Apr. 11, 2017

(54) CATALYST MATERIALS AND METHODS FOR REFORMING HYDROCARBON FUELS

(75) Inventors: Su Ha, Pullman, WA (US); M. Grant Norton, Pullman, WA (US)

(73) Assignee: Washington State University, Pullman, WA (US)

( * ) Notice: Subject to any disclaimer, the term of this patent is extended or adjusted under 35 U.S.C. 154(b) by 846 days.

(21) Appl. No.: 12/879,298

(22) Filed: Sep. 10, 2010

(65) Prior Publication Data

US 2011/0065017 A1   Mar. 17, 2011

Related U.S. Application Data

(60) Provisional application No. 61/241,779, filed on Sep. 11, 2009, provisional application No. 61/345,658, filed on May 18, 2010.

(51) Int. Cl.
| | |
|---|---|
| *B01J 23/00* | (2006.01) |
| *H01M 4/90* | (2006.01) |
| *H01M 4/86* | (2006.01) |
| *H01M 8/0612* | (2016.01) |
| *B01J 23/16* | (2006.01) |

(Continued)

(52) U.S. Cl.
CPC ....... *H01M 4/9016* (2013.01); *H01M 4/8621* (2013.01); *H01M 8/0618* (2013.01); *B01J 23/16* (2013.01); *B01J 23/28* (2013.01); *H01M 2008/1293* (2013.01); *Y02E 60/50* (2013.01); *Y02E 60/525* (2013.01)

(58) Field of Classification Search
CPC ............ H01M 4/9016; H01M 4/8621; H01M 8/0618; H01M 2008/1293; B01J 23/6525; B01J 23/88; B01J 23/883; B01J 23/16; B01J 23/24; B01J 23/28; Y02E 60/525; Y02E 60/50
USPC ................................. 429/527–528
See application file for complete search history.

(56) References Cited

U.S. PATENT DOCUMENTS

| | | |
|---|---|---|
| 2003/0165732 A1 | 9/2003 | McElroy |
| 2006/0127747 A1* | 6/2006 | Arico et al. ............ 429/44 |
| 2006/0165910 A1* | 7/2006 | Kodas et al. ........... 427/446 |

(Continued)

FOREIGN PATENT DOCUMENTS

| | | |
|---|---|---|
| EP | 1 808 920 | 7/2007 |
| WO | WO 2009-099447 | * 2/2008 |

(Continued)

OTHER PUBLICATIONS

STIC Search: Feb 6, 2015.*

(Continued)

*Primary Examiner* — Stephen Yanchuk
(74) *Attorney, Agent, or Firm* — Klarquist Sparkman, LLP

(57) ABSTRACT

In one embodiment, a composition for use in reforming is provided comprising a catalyst material comprising molybdenum dioxide and/or $MO_2$ (where M=Mo, W, Ru, Re, Os, Ir) nanoparticles having an average particle size from about 2 nm to about 1,000 nm; and a substrate, wherein both the molybdenum dioxide and/or $MO_2$ (where M=Mo, W, Ru, Re, Os, Ir) nanoparticles are substantially immobilized on the substrate. In another embodiment an anode for use in a fuel cell is provided comprising the forgoing composition. And in another embodiment a fuel cell is provided comprising the forgoing anode.

25 Claims, 12 Drawing Sheets

(51) Int. Cl.
 *B01J 23/28* (2006.01)
 *H01M 8/124* (2016.01)

(56) References Cited

U.S. PATENT DOCUMENTS

| | | |
|---|---|---|
| 2007/0003823 A1* | 1/2007 | Mei et al. ................... 429/44 |
| 2008/0124613 A1* | 5/2008 | Gur ..................... H01M 4/90 |
| | | 429/442 |
| 2008/0206616 A1* | 8/2008 | Atanassova et al. ........... 429/30 |
| 2008/0219918 A1 | 9/2008 | Lee et al. |
| 2008/0220296 A1 | 9/2008 | Eichhorn et al. |
| 2008/0280190 A1 | 11/2008 | Dopp et al. |
| 2009/0023050 A1 | 1/2009 | Finnerty et al. |
| 2009/0218311 A1 | 9/2009 | Jiang et al. |
| 2009/0220829 A1 | 9/2009 | Lopes Correia Tavares et al. |

FOREIGN PATENT DOCUMENTS

| | | |
|---|---|---|
| WO | WO 2008/110651 | 9/2008 |
| WO | WO 2008/121128 A2 | 10/2008 |

OTHER PUBLICATIONS

STIC Search.*
Griffith et al., "Physical properties of promoted molybdenum catalysts," *Nature* 165:486-7, 1950.
International Search Report from corresponding PCT Application No. PCT/US2010/048458 dated Jun. 22, 2011.
Written Opinion of the International Search Report from corresponding PCT Application No. PCT/US2010/048458 dated Jun. 22, 2011.

* cited by examiner

Figure 7 (a-d):

Figure 11 (a-d):
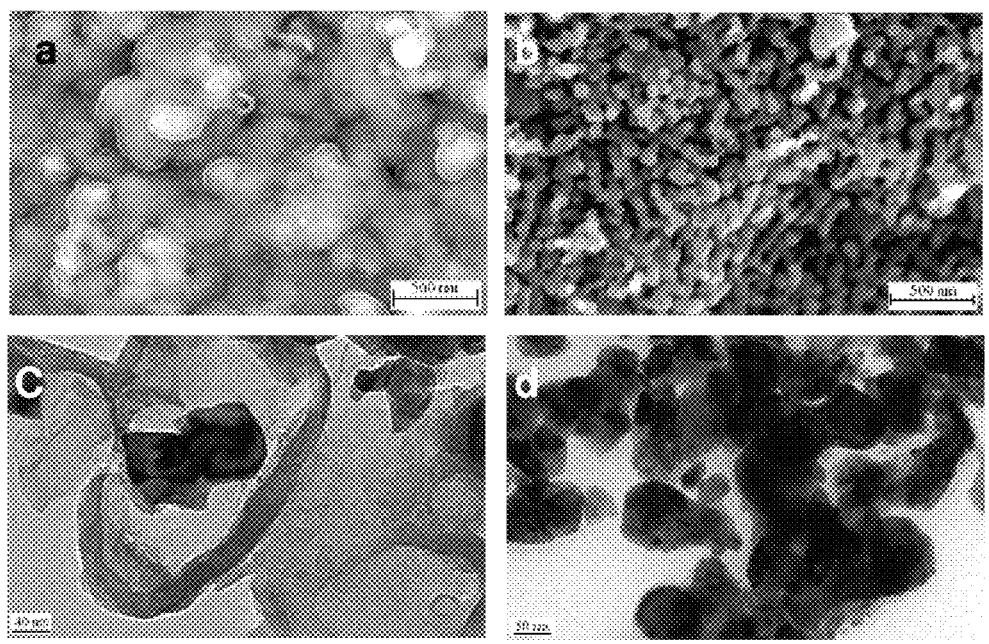

Figure 14 (A-C):

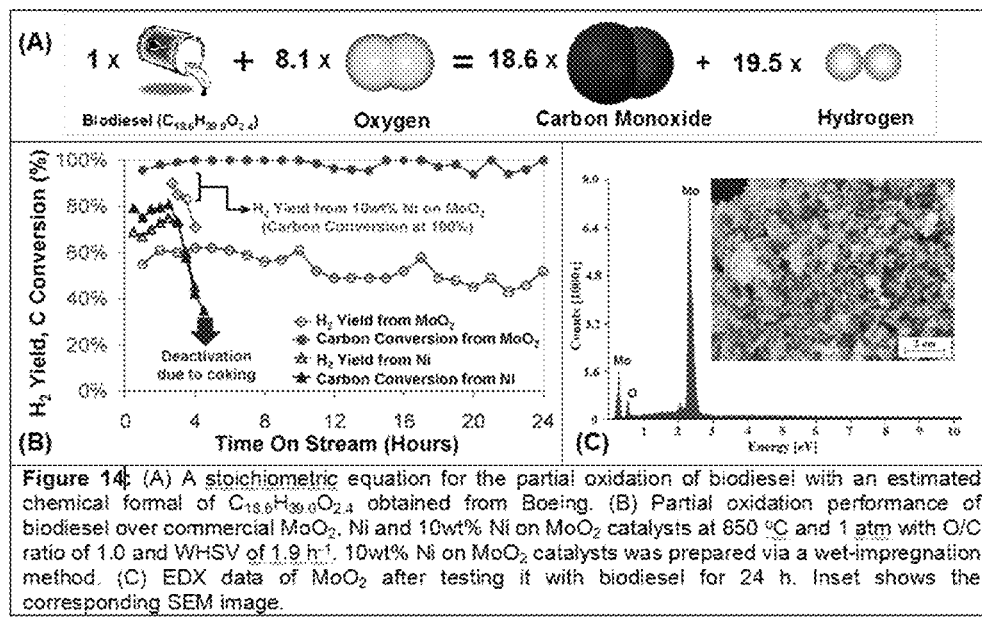

Figure 14: (A) A stoichiometric equation for the partial oxidation of biodiesel with an estimated chemical formal of $C_{18.6}H_{36.0}O_{2.4}$ obtained from Boeing. (B) Partial oxidation performance of biodiesel over commercial $MoO_2$, Ni and 10wt% Ni on $MoO_2$ catalysts at 850 °C and 1 atm with O/C ratio of 1.0 and WHSV of 1.9 $h^{-1}$. 10wt% Ni on $MoO_2$ catalysts was prepared via a wet-impregnation method. (C) EDX data of $MoO_2$ after testing it with biodiesel for 24 h. Inset shows the corresponding SEM image.

CATALYST MATERIALS AND METHODS FOR REFORMING HYDROCARBON FUELS

CROSS REFERENCE TO RELATED APPLICATION

This application claims the benefit of U.S. Provisional Application No. 61/241,779, filed Sep. 11, 2009, and U.S. Provisional Application No. 61/345,658, filed May 18, 2010, both of which are incorporated herein by reference.

FIELD

The present patent application relates to catalyst materials and methods of use.

BACKGROUND

Reforming technologies play a key role in the potential utilization of hydrocarbons in distributed applications for electricity generation. Specifically there is a need in the art for reforming technologies capable of hydrocarbon and/or biofuel oxidations to provide either hydrogen, small molecular weight carbon fragments (e.g. carbon oxides and methane) and/or small molecular weight alcohols, which can subsequently be utilized within a fuel cell for efficient, distributed electricity generation. Biofuels are various biomass derived fuels with a general chemical formula of $C_xH_yO_z$.

In one application solid oxide fuel cells (SOFCs) using a direct feed of Jet-A fuel and/or biofuels are of interest as replacements for the gas turbine auxiliary power unit (APU) employed on commercial airplanes. Similar hydrocarbon and/or biofuel feeds could be used for SOFCs providing power to airport ground transportation. In a third application the use of fuel cells in automotive applications would require a direct feed of gasoline, diesel and/or biofuels.

For SOFCs the reforming catalyst can act as the anode of the fuel cell. The fuel cell anode directly (1) reforms the hydrocarbon and/or biofuel feeds to hydrogen, small carbon fragments (e.g., carbon oxides or methane) and/or small oxygenated hydrocarbons which are electrochemically oxidized at the anode to generate electricity; and/or (2) directly oxidize the hydrocarbon and/or biofuel feeds to water and carbon dioxide to generate electricity.

One example of a need for distributed electricity generation is the aircraft industry. The aircraft industry has seen interest in substituting electrically driven systems for hydraulically and pneumatically driven systems. However, such substitutions increase the electrical power requirements of aircraft.

Aircraft typically employ combustion-type auxiliary power units to provide electrical power to various electronic systems, such as navigation systems and the like. For example, commercial aircraft typically employ gas turbine auxiliary power units to supply the aircraft with auxiliary power. However, combustion-type auxiliary power units, such as gas turbine units, are known to have relatively low thermodynamic efficiencies and therefore consume significant amounts of the aircraft's aviation fuel supply. Furthermore, the weight of combustion-type auxiliary power units, as well as the extensive wiring associated with such units, significantly contribute to the overall weight of the aircraft, thereby further decreasing the aircraft's fuel efficiency.

Growing concerns over the use of fossil fuels have led commercial aircraft designers and manufacturers to explore new techniques for increasing the efficiency of combustion-type auxiliary power units, as well as alternative sources of auxiliary power. One alternative to using combustion-type auxiliary power units is to use fuel cells. Fuel cells generally have higher thermodynamic efficiencies and weigh significantly less than combustion-type auxiliary power units. Therefore, fuel cells offer the potential to supply the required auxiliary power while significantly reducing the consumption of fossil fuels.

Accordingly, those skilled in the art continue to seek advances in the use of reforming technologies for use within or in conjunction with fuel cells to provide sources of auxiliary power.

SUMMARY

One aspect of the invention relates to materials for hydrocarbon and/or biofuel reforming and, more particularly, to the use of these materials in conjunction with or as a component of fuel cells configured to operate on a direct hydrocarbon and/or biofuel feeds and, even more particularly, to SOFCs configured to operate on a direct feed of logistics fuels and fuels derived from biomass.

According to a further aspect, the invention provides:
a cathode;
an anode comprising a catalyst material including $MO_2$ nanoparticles, wherein M is selected from Mo, W, Ru, Re, Os or Ir; and
an electrolyte disposed between said cathode and said anode.

In another aspect of the disclosed reforming technology, a catalyst material composed of molybdenum dioxide ($MoO_2$) is disclosed. Other possible catalytic materials include, but are not limited to, ceramic oxides that exhibit high electrical conductivity where the cation can exist in more than one valence state. Further possible catalytic materials include, but are not limited to, metal oxides with a general chemical formula of $MO_2$ (where M=Mo, W, Ru, Re, Os, Ir) that exhibit both ionic and electrical conductivities suitable for use as electrodes in fuel cells that utilize a hydrocarbon and/or biofuel as a direct feed. Such catalysts that exhibit both ionic and electrical conductivities are referred to as "mixed conductive" materials. In the certain embodiments, M is a cation that can exist in more than one valence state.

In another embodiment, the catalyst may optionally be doped with a dopant selected from the group comprising $SiO_2$, $TiO_2$, $SnO_2$, and $CeO_2$ or a mixture of one or more of these oxides. The catalyst may be optionally doped with other oxides not recited above. In an embodiment, the dopant concentration is typically less than 50%. In certain embodiments, the dopant oxide may show partial solid solubility in the host oxide.

In another embodiment, the catalyst may optionally be doped with a dopant selected from the group comprising: Co, Ni, Cu, Rh, Pd, Ag, Ir, and Pd or a mixture of one or more of these metals. The catalyst may be optionally doped with other metals and/or other metal oxides not recited above. In an embodiment, the dopant concentration is typically less than 50%.

In another embodiment, the catalyst may optionally be doped with a dopant selected from the group comprising: $SiO_2$, $TiO_2$, $SnO_2$, $CeO_2$, Co, Ni, Cu, Rh, Pd, Ag, Ir and Pd or a mixture of one or more of these metals or metal oxides.

In another embodiment, the catalyst may optionally be doped with metal oxides to control its metal-oxygen bond strength and to adjust its redox stability. In another embodiment, the catalyst may optionally be doped with metal oxides to control its lattice parameter and axial ratio, and to adjust its electronic conductivity.

In one embodiment the reforming technology is comprised of a nanostructured body of catalyst material. The nanostructured body may comprise discrete nanoparticles. Preferably, the nanoparticles have average particle size less than about 1000 nm, less than about 200 nm, less than about 100 nm and/or greater than about 2 nm. Therefore, in an embodiment the catalyst material has an average particle size in the range of about 1 to about 200 nanometers. In another embodiment, the nanoparticles have an average particle size from about 2 nm to about 1,000 nm. In still another embodiment, the catalyst material has an average particle size in the range of about 200 to about 1,000 nanometers.

The nanoparticles can be immobilized on a substrate material or support. In an embodiment, the nanoparticles are substantially immobilized on a matrix material. In an embodiment, the matrix material is ceramic material. In an embodiment, the matrix material includes at least one of yttrium stabilised zirconia and samarium doped ceria.

In yet further embodiments the nanostructured body may comprise a patterned or randomly etched bulk catalyst operable to provide an enhanced surface area for catalytic activity. As used herein the term 'doped' refers to catalyst materials that comprise a bulk mixture of discrete catalytic particles (e.g. a mixture of $MoO_2$ particles and Ni particles) or catalyst materials that comprise a discrete catalytic particles wherein the parent material and dopant are present within the same particle (e.g. $MoO_2$—Ni alloy particles).

In an embodiment, the catalyst material has a surface area of at least about 10 square meters per gram.

In an embodiment, the electrolyte is a solid oxide electrolyte.

In an embodiment, the catalyst material comprises a mixture of a first group of $MO_2$ nanoparticles and at least one different group of $MO_2$ nanoparticles (e.g. a second group of $MO_2$ nanoparticles), wherein M in the first group is a different material compared to the M in the at least one different group.

In an embodiment, the fuel cell is a SOFC.

In yet further aspects, the disclosed reforming technology provides for the reformation of a hydrocarbon fuel and/or biofuels to yield low molecular weight products suitable for use within a fuel cell.

In one aspect, the disclosed catalyst material may provide an anode material suitable for use in both a direct and indirect hydrocarbon fuel and/or biofuel SOFC. The SOFC can include a cathode, an anode that includes the catalyst material, and an electrolyte disposed between the cathode and the anode.

In another aspect, the fuel cell is a solid oxide fuel cell which includes a cathode formed from a first ceramic material, an anode including catalyst material carried by a second ceramic material, the catalyst material having an average particle size less than about 1000 nanometers, and an electrolyte positioned between the cathode and the anode, the electrolyte being formed from a third ceramic material. In an embodiment, the second and third ceramic materials are the same. In other embodiments, the second and third ceramic materials are different.

In yet another aspect, the disclosed method for powering an external load circuit may include the steps of providing an SOFC including an anode, a cathode and an electrolyte, the anode including a catalyst material, electrically coupling the anode and the cathode to the external load circuit, supplying a hydrocarbon and/or biofuel to the anode and supplying an oxidant to the cathode.

Other features and advantages of the present invention will become apparent from the following detailed description. It should be understood, however, that the detailed description and the specific examples, while indicating the preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

FIG. 11 shows SEM and TEM images of spent samples of commercial $MoO_2$ (a and c) and MDNPs (b and d), including electron diffraction patterns.

FIG. 14 shows: (A) A stoichiometric equation for the partial oxidation of biodiesel with an estimated chemical formal of $C_{18.6}H_{39.0}O_{2.4}$ obtained from Boeing; (B) Partial oxidation performance of biodiesel over commercial $MoO_2$, Ni and 10 wt % Ni on $MoO_2$ catalysts at 850° C. and 1 atm with O/C ratio of 1.0 and WHSV of 1.9 $h^{-1}$. 10 wt % Ni on $MoO_2$ catalysts was prepared via a wet-impregnation method; and (C) EDX data of $MoO_2$ after testing it with biodiesel for 24 h. Inset shows the corresponding SEM image.

DETAILED DESCRIPTION

Figure 1:
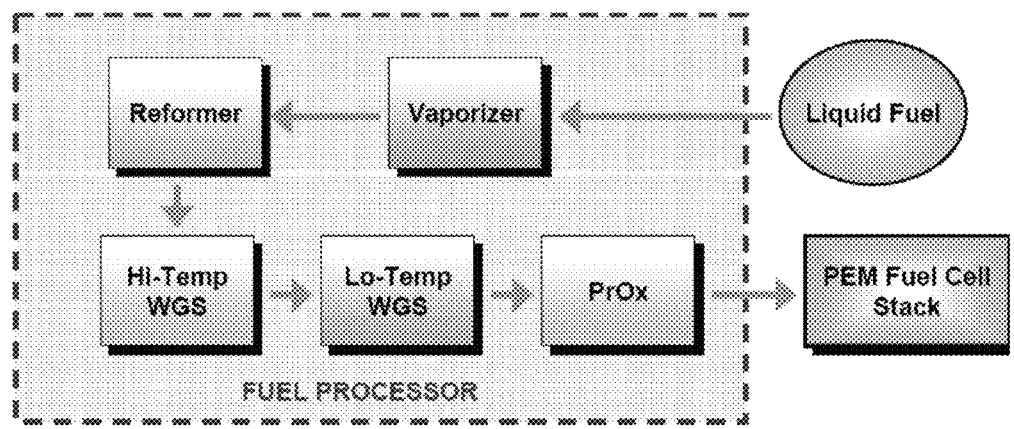
FIG. 1 shows how a reformer disclosed herein may be used in conjunction with a fuel cell.

In order to fully understand the manner in which the above-recited details and other advantages and objects according to the invention are obtained, a more detailed description of the invention will be rendered by reference to specific embodiments thereof.

In one aspect the disclosed reforming technology is a catalyst material composed of molybdenum dioxide ($MoO_2$). In other aspects the catalytic materials include, but are not limited to, metal oxides with a general chemical formula of $MO_2$ (where M=Mo, W, Ru, Re, Os, Ir) that exhibit both high ionic and electrical conductivities where the cation can exist in more than one valence state. In another aspect, the catalyst may optionally be doped with $SiO_2$, $TiO_2$, $SnO_2$, $CeO_2$, and other oxides at a concentration typically less than 50%. In another aspect, the catalyst may optionally be doped with Co, Ni, Cu, Rh, Pd, Ag, Ir Pd, other metals and/or other metal oxides at a concentration typically less than 50%. In another aspect, the catalyst may optionally be doped with metal oxides to control its metal-oxygen bond strength and to adjust its redox stability. In another aspect, the catalyst may optionally be doped with metal oxides to control its lattice parameter and axial ratio, and to adjust its electronic conductivity. In certain embodiments, the catalyst material comprises a mixture of a first group of $MO_2$ nanoparticles and at least one different group of $MO_2$ nanoparticles, wherein M in the first group is a different material compared to M in the second group. For example, the catalyst material could comprise discrete $MoO_2$ nanoparticles mixed with discrete $MO_2$ nanoparticles wherein M is not Mo.

In one embodiment, the ionic conductivity of the catalytic material is such that it is effective as a catalyst for reforming a hydrocarbon and/or a biofuel. For example, the desired ionic conductivity of the catalytic material when used in the anode is less than that of the electrolyte membrane. In these embodiments, the ionic conductivity of the catalytic material may range between 0.1 and 0.001 S/cm at a temperature of 500 to 1300° C. In other embodiments, the ionic conductivity of the catalytic material is sufficiently high to provide a maximum power density of 1 $W/cm^2$ at 800° C. or higher for a SOFC operating with logistic fuel or a biofuel while preventing coking of the catalytic material.

In one embodiment, the electrical conductivity of the catalytic material is such that is effective as an electrode (particularly an anode) in fuel cells (particularly SOFC). For example, the catalytic material may have an electrical conductivity at room temperature of 10 S/cm to 10e5 S/cm.

Preferred catalytic materials are mixed conductive materials that are characterized by having both ionic and electrical conductivity effective for use as an anode in a SOFC that receives a hydrocarbon and/or biofuel as a direct and/or indirect feed. Illustrative effective ionic and electrical conductivities are those described above.

In one embodiment the reforming technology is comprised of a nanostructured body of catalyst material. Preferably, the nanoparticles have average particle size less than about 1000 nm, less than about 500 nm, less than about 200 nm, less than about 100 nm, less than about 50 nm, and/or greater than about 2 nm. The nanoparticles can be immobilized or substantially immobilized on a substrate material. Suitable substrate materials include, but are not limited to, zeolite, $SiO_2$, $CeO_2$, $ZrO_2$, $CeZrO_2$ at different atomic ratios between Ce and Zr. In some embodiments, the catalyst material nanoparticles, including $MoO_2$, can be immobilized on these substrate materials using various techniques, including wet-impregnation and co-precipitation methods.

In yet further aspects the nanostructured body may comprise a patterned or randomly etched bulk catalyst operable to provide an enhanced surface area for catalytic activity.

In yet further aspects, the disclosed reforming technology can provide means for the reformation of hydrocarbon and biofuels to yield low molecular weight products suitable for use within a fuel cell. Examples of low molecular weight products include hydrogen, carbon dioxide, carbon monoxide and other $C_xH_yO_z$ compounds. Hydrocarbon fuels are here defined as various logistics fuels including various Jet fuels, kerosene, diesel and gasoline and biofuels are various biomass derived fuels.

Figure 2:
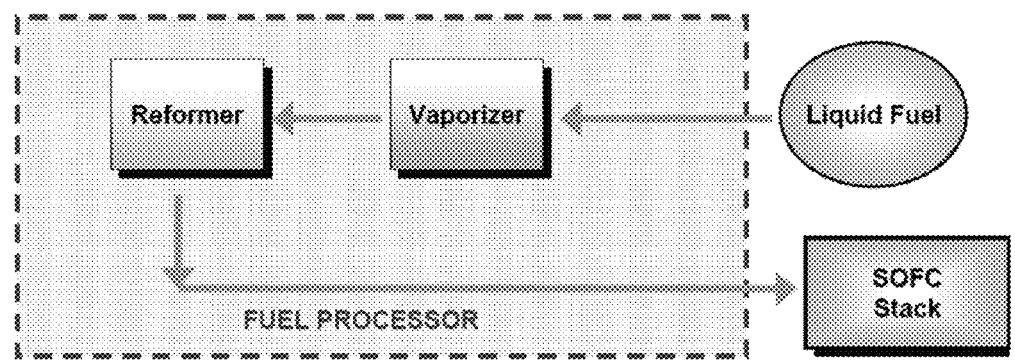
FIG. 2 shows how a reformer disclosed herein may be used in conjunction with a fuel cell.

In one aspect, the disclosed catalyst materials may be used as reforming catalysts. Specifically, various hydrocarbon and biofuels may be fed into the reformer with the disclosed catalyst materials, to yield low molecular weight products suitable for use within a low temperature fuel cells including polymer electrolyte membrane (PEM) fuel cells, also known as proton exchange membrane fuel cells, and a high temperature fuel cells including SOFCs. FIGS. 1 and 2 show how a reformer with the disclosed catalyst materials may be used in conjunction with different fuel cell units.

In one aspect, the disclosed catalyst material may provide an anode material suitable for use in a SOFC. The SOFC may include a cathode, an anode that includes the catalyst material, and an electrolyte disposed between the cathode and the anode.

It has now been discovered that hydrocarbons, such as aviation fuel (e.g., Jet-A fuel), and/or biofuels (e.g. biodiesel) may be effectively used to directly power fuel cells. Specifically, it has now been discovered that hydrocarbons, such as aviation fuel, and/or biofuels, such as biodiesel, may be directly supplied to the disclosed SOFC, wherein the hydrocarbons and/or biofuels may be internally reformed into the hydrogen-containing syngas, other carbon fragments and/or small molecular weight of oxygenated hydrocarbon fragments that drives the electrochemical reactions that produce electricity.

Figure 3:
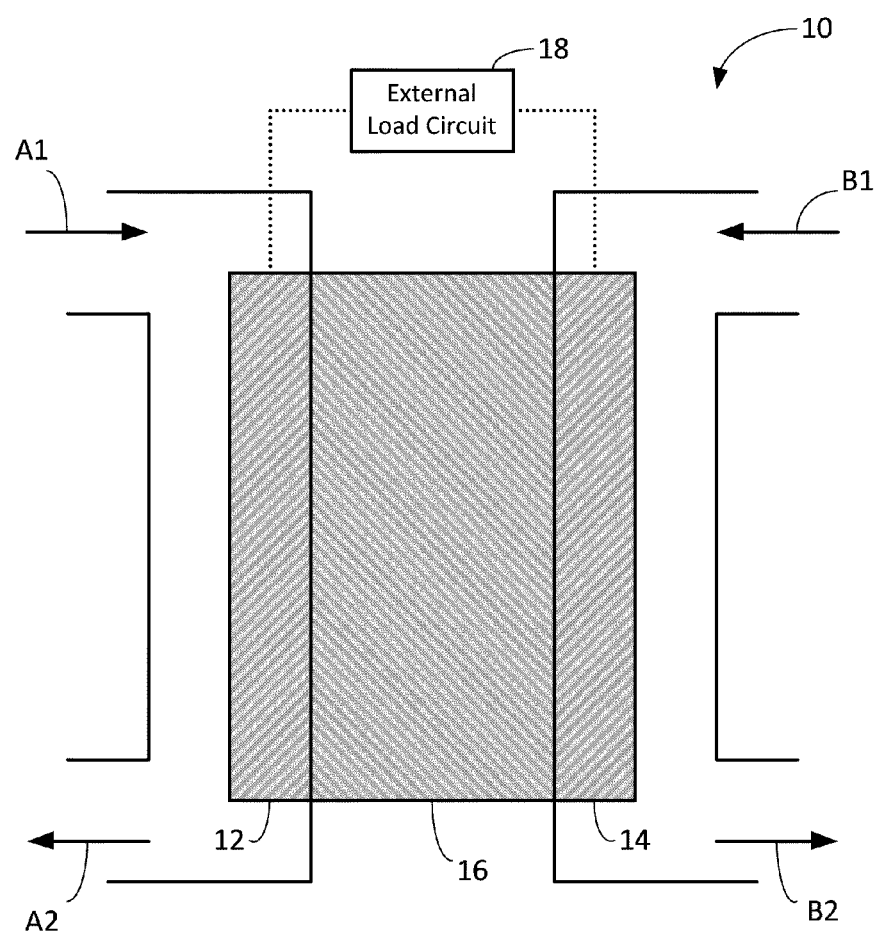
FIG. 3 is a schematic block diagram of one aspect of a direct hydrocarbon and/or biofuel SOFC.

As shown in FIG. 3, one aspect of the disclosed direct hydrocarbon and biofuel SOFC, generally designated 10, may include a molybdenum dioxide-containing anode 12, a cathode 14 and an electrolyte 16 disposed between the anode 12 and the cathode 14. The anode 12 may be electrically coupled to the cathode 14 by way of an external load circuit 18. Hydrocarbon fuel and/or biofuel stream, shown by arrows $A_1$ and $A_2$, may pass across the anode 12. An oxidant stream (e.g., air), shown by arrows $B_1$ and $B_2$, may pass across the cathode 14. The incoming streams $A_1$, $B_1$ may feed the electrochemical reactions that power the external load circuit 18.

The hydrocarbon fuel and/or biofuel stream $A_1$ may include one or more hydrocarbons and/or oxygenated hydrocarbons and, optionally, a carrier gas (e.g., nitrogen). The hydrocarbons and/or biofuels in the fuel stream $A_1$ may be substantially linear molecules, branched molecules, aromatic molecules, oxygenated hydrocarbons with various functional groups or combinations thereof. In one aspect, the hydrocarbons and/or biofuels in the fuel stream $A_1$ may be light hydrocarbons having 1 to 6 carbon atoms per molecule and/or oxygenated hydrocarbons with various functional groups. In another aspect, the hydrocarbons and/or oxygenated hydrocarbons in the fuel stream $A_1$ may be heavy hydrocarbons having 7 or more carbon atoms per molecule and/or oxygenated heavy hydrocarbons with various functional groups. For example, the fuel stream $A_1$ may include dodecane and/or biodiesel. In yet another aspect, the fuel stream $A_1$ may include a mixture of light and heavy hydrocarbons and/or light and heavy oxygenated hydrocarbons with various functional groups. In a further aspect, the oxygenated hydrocarbon may be an oxygenated fuel that contains 0.5 to 50% by weight oxygen.

In one particular aspect, the hydrocarbons and/or oxygenated hydrocarbons in the fuel stream $A_1$ may be various petroleum-based fuels and/or various biomass-based fuels. As one example, the fuel stream $A_1$ may include aviation fuel, such as Jet-A jet fuel, and/or bio aviation fuel, such as biodiesel. Other examples of petroleum-based fuels that may be supplied as the fuel stream $A_1$ include gasoline, diesel (including bio-diesel) and kerosene.

The electrolyte 16 may be a layer of material capable of conducting oxygen ions from the cathode 14 to the anode 12, while electrically isolating the anode 12 and the cathode 14. One example of a material for forming the electrolyte 16 is yttrium stabilized zirconia ("YSZ"). Another example of a material for forming the electrolyte 16 is samarium domed ceria ("SDC"). Other appropriate materials for forming the electrolyte 16 of the disclosed SOFC 10 will become readily apparent to those of ordinary skill in the art upon reading the present disclosure.

The cathode 14 may be an electrically conductive layer coupled to the electrolyte 16. In one aspect, the cathode 14 may be porous to facilitate the formation and passage of oxygen ions to the electrolyte 16. One example of a material for forming the cathode 14 is lanthanum strontium manganite ("LSM"), an electrically conductive oxide ceramic material. Another example of a material for forming the cathode 14 is barium strontium cobalt ferrite oxide ("BSCF"). In yet another example, the cathode 14 may be formed from a mixture of BSCF and SDC. Other appropriate materials for forming the cathode 14 of the disclosed SOFC 10 will become readily apparent to those of ordinary skill in the art upon reading the present disclosure.

The anode 12 may be an electrically conductive layer coupled to the electrolyte 16, wherein the anode 12 includes molybdenum dioxide ($MoO_2$). Molybdenum dioxide exhibits an unusual metallic-like electronic conductivity. Without being limited to any particular theory, the electrical conductivity of molybdenum dioxide may be attributed to a relatively high density of states in the valence band, which is also believed to enhance the catalytic activity of $Mo^{4+}$ in molybdenum dioxide. Furthermore, because molybdenum dioxide possesses both high ionic and electronic conductivities, the three-phase boundary can be extended over the entire anode surface, thereby significantly reducing overpotential losses at higher currents.

The anode 12 may be formed as a composite material comprising molybdenum dioxide in a matrix material. The matrix material may be a ceramic material such as SDC, YSZ or the like. Other useful matrix materials will be readily apparent to those of ordinary skill in the art. In one particular aspect, the matrix material of the anode 12 may be the same or similar to the material used to form the electrolyte 16. At this point, those skilled in the art will appreciate that existing cermet techniques may be used to incorporate the molybdenum dioxide into the matrix material of the anode 12.

The anode 12 may be formed as a material comprising doped molybdenum dioxide with various doping materials. The doping material may be $SiO_2$, $TiO_2$, $SnO_2$, $CeO_2$, and other refractory metal oxides at a concentration typically less than 50%. In another aspect, the doping material may be Co, Ni, Cu, Rh, Pd, Ag, Ir Pd, other metals and/or other metal oxides at a concentration typically less than 50%.

In one aspect, the molybdenum dioxide in the anode 12 may be a high surface area molybdenum dioxide. In a first exemplary aspect, the molybdenum dioxide in the anode 12 may have a surface area of at least about 10 $m^2/g$. In a second exemplary aspect, the molybdenum dioxide in the anode 12 may have a surface area of at least about 50 $m^2/g$. In a third exemplary aspect, the molybdenum dioxide in the anode 12 may have a surface area of at least about 75 $m^2/g$. In a fourth exemplary aspect, the molybdenum dioxide in the anode 12 may have a surface area of at least about 100 $m^2/g$. Without being limited to any particular theory, it is currently believed that catalyst material having higher surface areas will have a higher catalytic activity for reforming hydrocarbons, including heavy hydrocarbons.

Those skilled in the art will appreciate that high surface area molybdenum dioxide may be obtained by preparing nanoparticles of molybdenum dioxide. Nanoparticles of molybdenum dioxide having average particle sizes in the range of less than 50 to about 200 nanometers have been prepared and tested, and have shown to provide desired yield and conversion rates. It is presently believed that particles of molybdenum dioxide having an average particle size of less than 1000 nanometers (i.e., high surface area particles) may be particularly advantageous, though larger particles may be used.

One exemplary technique for preparing molybdenum dioxide nanoparticles begins by reducing ammonium heptamolybdate tetrahydrate (the precursor) in an autoclave at 180° C. using a 3:1 mixture of water to ethylene glycol. The resulting black molybdenum dioxide nanoparticles may be filtered and dried prior to use. Using this technique, molybdenum dioxide nanoparticles were obtained in which a majority of the nanoparticles were less than 50 nanometers in diameter and most were less than 200 nanometers in diameter. These results were confirmed using x-ray diffraction (a peak at $2\theta=30.5$ degrees) and high-resolution transmission electron microscopy. Other exemplary techniques for preparing nanoparticles of molybdenum dioxide include drying a citrate sol-gel, rheological phase reaction and precipitation of molybdenum salts using hexamethylenetetramine.

Optionally, the molybdenum dioxide in the anode 12 may be supported. For example, the anode 12 may include catalyst material supported on a zeolite and/or other metal oxides.

At this point, those skilled in the art will appreciate that the anode 12 and the cathode 14 may be constructed to have coefficients of thermal expansion that closely match the coefficient of thermal expansion of the electrolyte 16, thereby minimizing the risk of mechanical failure when subject to typical operating temperatures (e.g., 800 to 1000° C.). For example, the matrix material in the anode 12 may be selected to impart the anode 12 with a desired coefficient of thermal expansion.

An exemplary SOFC of the present disclosure may be formed as follows. An SDC powder may be hydrostatically pressed (e.g., at about 50 MPa) into a pellet and sintered in air for about 5 hours at a temperature of about 1300° C. The pellet may be cut into a disk and the disk surface may be polished to achieve the desired thickness (e.g., about 400 millimeters). A first slurry may be prepared by mixing molybdenum dioxide with powdered SDC. For example, the weight ratio of the molybdenum dioxide to SDC may be about 60:40. The first slurry may be sprayed onto a first side of the electrolyte disk and then sintered in an argon atmosphere for about 5 hours at a temperature of about 900° C. to yield an anode having a thickness of about 50 millimeters. A second slurry may be prepared by mixing powdered BSCF with powdered SDC. For example, the weight ratio of the BSCF to the SDC may be about 70:30. The second slurry may be sprayed onto a second side of the electrolyte disk and then calcined in an argon atmosphere for about 5 hours at a temperature of about 900° C. to yield a cathode having a thickness of about 15 millimeters.

In another aspect, an exemplary SOFC of the present disclosure may be formed using electrostatic spray deposition (ESD) method. The ESD is a simple technique suitable for the rapid production of oxide films that has been proven effective for producing both dense films and porous structures of SOFC electrolyte and cathode materials. This technique has been also used to prepare mixed conductive $RuO_2$ thin films. In the ESD process, a fine mist of very small droplets containing metal precursors, typically nitrates or chloride, in the desired concentration is generated through the nozzle supplying the high voltage power. The fine mist is sprayed onto the preheated substrate. This substrate may be YSZ or SDC (i.e. samarium doped ceria) electrolyte disk. Over the substrate surface, the fine mist undergoes evaporation and precursor thermal decomposition which leads to the film formation over the substrate. The film thickness can be varied from 100 nm to 20 μm by changing the deposition time. The film composition will be controlled by the composition of precursor solutions. The anode film composition will be similar to the composition of $M_xN_{(1-x)}O_2$ (where M=Mo, W, Ru, Re, Os, Ir and N=various doping materials) nanoparticles that show the most promising oxidation activity toward both hydrocarbons and oxygenated hydrocarbons. The gold current collector will be patterned on top of the $M_xN_{(1-x)}O_2$ thin-film using photolithographic techniques.

Accordingly, the resulting fuel cell may be used to directly convert hydrocarbons and/or oxygenated hydrocarbons into electrical energy.

The reforming activity of molybdenum dioxide was evaluated using an aviation fuel model comprised of an 80:20 (molar ratio) mixture of dodecane and tetralin. Dodecane was used to represent the paraffins in aviation fuel, while tetralin was used to represent coke-forming bicyclic compounds in aviation fuel. The molybdenum dioxide used for the evaluation was a commercially available molybdenum dioxide having an average particle size in the 1 to 10 micron range. Initially, 0.5 grams of molybdenum dioxide was placed into a quartz-tube reforming reactor. Hydrogen was fed into the system for 30 minutes to remove any surface $MoO_3$. The reactor was then purged with argon. Once purged, a mixture of the aviation fuel model in air was supplied at an oxygen to carbon ("O:C") ratio of 0.7, a temperature of 750° C. and weight-hourly space velocity ("WHSV") of 0.6 h$^{-1}$. A conversion and hydrogen yield of about 100 percent was observed. This result shows that molybdenum dioxide possesses an exceptionally high catalytic activity to reform long-chain hydrocarbons (e.g., dodecane) into hydrogen at a very low temperature under partial oxidation conditions. Steam reforming of isooctane using molybdenum dioxide was also performed at a steam to carbon ratio of 1:2 and a reforming temperature of 750° C., resulting in a 90 percent conversion and a hydrogen yield of about 75 percent. Thus, it is possible to operate $MoO_2$ based reformer under the thermally neutral autothermal reaction condition.

To measure the resistance of molybdenum dioxide to deactivation caused by coking, molybdenum dioxide was tested using premium gasoline with an aromatic content of about 37 percent. Aromatic compounds are known coking-precursors. The performance of molybdenum dioxide was compared to a nickel-based catalyst (Ni/CeZrO$_4$). The test was performed at an O:C ratio of 0.72, a WHSV of 0.61 h$^{-1}$ and a temperature of 700° C. As shown in FIG. 2, even after 7 hours on stream, the catalytic performance exhibited by molybdenum dioxide was fairly stable, obtaining a hydrogen yield of 94 percent and a 100 percent conversion. The nickel catalyst started with a hydrogen yield of 100 percent and a conversion of 68 percent, but these values diminished to 59 percent and 37 percent, respectively, after 4 hours on stream. The low conversion obtained with the nickel catalyst is the direct result of coke formation, which eventually plugged the reactor. Therefore, molybdenum dioxide has a relatively high coke resistance during the partial oxidation of complex fuels with a high concentration of aromatics.

Finally, the molybdenum dioxide catalyst was tested for sulfur tolerance using thiophene as a model sulfur compound. The concentration of thiophene used was 500 ppm, which is very similar to the sulfur concentration of typical aviation fuel. Isooctane was mixed with 500 ppm of thiophene and this mixture was fed into the reactor containing molybdenum dioxide. While the thiophene appeared to partially affect hydrogen yield, the conversion remained practically constant at 100 percent. Furthermore, purging the reactor with helium appeared to completely refresh the catalyst. X-ray photoelectron spectroscopy (XPS) analysis of molybdenum dioxide following the purging process showed no presence of residual sulfur. Therefore, molybdenum dioxide has a very high sulfur tolerance and any adsorbed sulfur compounds can be easily removed from the surface by a simple purging process.

Accordingly, the disclosed catalysts and SOFCs are believed to have the following advantages: (1) high reforming activity for converting heavy hydrocarbons (e.g., Jet-A jet fuel) and/or oxygenated hydrocarbons into $H_2$ and CO; (2) high electrochemical activity for oxidizing hydrogen and carbon monoxide; (3) good electronic conductivity (e.g., >10$^4$ S/m); (4) high oxygen anion mobility to extend the reaction zone (i.e., the three-phase boundary); and (5) high coke resistance and sulfur tolerance to give long term stability.

EXAMPLES

Reforming Isooctane

Experiments were performed in a 12 mm fixed-bed tubular (quartz) reactor. The liquid feed, consisting of either isooctane or premium gasoline, was vaporized at 200° C. and 350° C., respectively. The vapor obtained was mixed along with air, employed as oxygen source for the partial oxidation, using a silicon carbide bed to enhance the mixing. Calibrated syringe pumps and mass flow controllers were employed to control the flow rates. The exit stream was cooled down to 5° C. to separate water, non-reacted fuel, and other possible condensable compounds from the off-gas. The dry gas product was analyzed using an SRI chromatograph to monitor $H_2$, CO, $CO_2$, and $CH_4$ concentrations. The GC columns used for this purpose were Molecular Sieve 13× and HyesepD. The carrier gas was a mixture of 10% hydrogen and 90% helium.

The $MoO_2$ catalyst was purchased from Alfa Aesar. The catalyst sample was supported by a quartz wool plug placed inside the reactor. Spent samples were analyzed by powder X-ray diffraction (XRD) on a Philips diffractometer that employs Co Kα radiation with an iron filter. XPS spectra were obtained with an AXIS-165 manufactured by Kratos Analytical Inc. using an achromatic MgKα (1254 eV) X-ray radiation with a power of 210 W. The binding energy was calibrated against the 4f$_{7/2}$ line of clean Au to be at 84 eV. A pass energy (PE) of 80 eV was used to acquire all survey scans. At this PE the energy resolution was about 1.2 eV. The high-resolution spectra of Mo 3d were acquired at PE of 40 eV with an energy resolution of about 0.8 eV. The base pressure of the XPS analyzing chamber was 1.0×10$^{-9}$ Torr. Before performing any XPS analysis, the powdered samples were pressed into pure indium (99.99% pure) in order to minimize the effects of charging. The curve fitting of high-resolution spectra was performed using a least-squares fitting program. Mo3d spin-orbit pair intervals were set at 3.13 eV, and an area ratio of 0.666 was used. To prevent further oxidation between the end of the experiment and the XPS or XRD analysis, the samples were cooled down to room temperature inside the reactor under helium. BET surface area measurements were performed using a Coulter SA-3100 automated characterization machine. The data was analyzed in terms of hydrogen yield and carbon conversion, which were calculated as follows:

For isooctane as fuel:

$$H_2 \text{ yield} = \frac{2 \times n_{H_2}^{out}}{18 \times n_{C_8H_{18}}^{in}}$$

$$C \text{ conversion} = \frac{n_{CH_4}^{out} + n_{CO}^{out} + n_{CO_2}^{out}}{8 \times n_{C_8H_{18}}^{in}}$$

For premium gasoline ($C_7H_{13}$) as fuel:

$$H_2 \text{ yield} = \frac{2 \times n_{H_2}^{out}}{13 \times n_{Gas}^{in}}$$

$$C \text{ conversion} = \frac{n_{CH_4}^{out} + n_{CO}^{out} + n_{CO_2}^{out}}{7 \times n_{Gas}^{in}}$$

When gaseous oxygen is supplied to the system, the selective oxidation of hydrocarbons using transition metal oxides becomes a catalytic process and is called partial oxidation. Gaseous oxygen, $O_2$, is adsorbed as $O^-$, $O^{2-}$, or incorporated into the oxide structure as lattice oxygen via a reduction process. The electrons gained by the adsorbed oxygen are those previously released during the oxidation of the hydrocarbon molecules. This reaction mechanism formed by consecutive cycles of oxidation and reduction steps was first studied by Mars and van Krevelen in 1954.

The mechanism starts with the decomposition of the hydrocarbon on the oxide surface by the dual sites existing on the catalyst surface. In this step, Mo tetravalent ions, $Mo^{4+}$, gain electrons from the hydrocarbon molecules. Next, lattice oxygen is transferred from the surface into the smaller hydrocarbon molecules formed in the previous step, producing carbon oxides, hydrogen and water. The vacancies created during this transfer are replenished by oxygen ions coming from the metal oxide bulk structure. Finally, the gaseous oxygen fed into the system is to replenish the catalyst bulk structure and consume the electrons released during the first step of the process. The global reaction to express this catalytic process is formulated as follows:

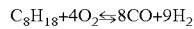

$$C_8H_{18} + 4O_2 \leftrightarrows 8CO + 9H_2$$

Figure 4A:
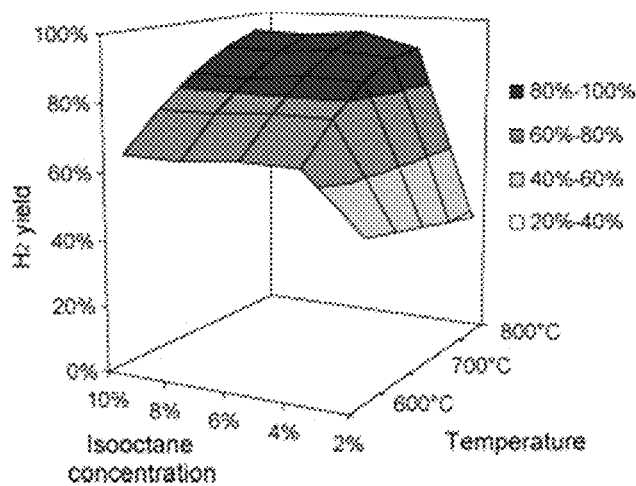
FIG. 4A shows a thermodynamic analysis of isooctane partial oxidation.

Thermodynamic analysis was performed to study the limitations of this process under different temperatures and fuel concentrations. The results obtained were expressed in terms of $H_2$ yield and are shown in FIGS. 4A and B.

The long-term stability was tested by duplicating the experiment at O/C=0.72 using the same operating conditions except for the time on stream (TOS), which was increased to 20 h. The evolution of the performance is reported in Table 1, where the concentrations were calculated considering the nitrogen and the unreacted oxygen.

TABLE 1

Long-term stability test.

| TOS (h) | $H_2$ yield | Conversion | Molar concentrations | | | |
|---|---|---|---|---|---|---|
| | | | $H_2$ | CO | $CH_4$ | $CO_2$ |
| 2 | 81% | 99% | 22% | 14% | 4% | 6% |
| 5 | 83% | 100% | 22% | 14% | 4% | 8% |
| 9 | 82% | 100% | 21% | 12% | 3% | 8% |
| 20 | 78% | 100% | 20% | 12% | 4% | 9% |

After a continuous period of 20 h on stream, the catalytic activity appears to be barely affected as inferred from the slight decline in the $H_2$ yield (from 81% to 78%) and the stable conversion (100%). However, the selectivity seems to be affected by the time on stream. Thus, after a period of 20 h, the concentrations of $H_2$ and CO were reduced by 2%, whereas the concentration of $CO_2$ was increased by 3%. These results suggest a change in the selectivity as a result of the large concentration of oxygen in the feed stream, which enhances the full oxidation of the fuel (that produces $CO_2$ and $H_2O$) at the expense of the partial oxidation (that produces CO and $H_2$). The concentration of methane, $CH_4$, remains constant because it is formed through the thermal decomposition of the fuel and not as a consequence of the oxidation processes.

Preliminary experiments carried out to measure the thermal stability of $MoO_2$ indicates that sintering is not an issue for $MoO_2$ catalysts when exposed to reforming environments. In light of this finding, the drop in the performance is most likely not attributed to sintering effects.

The XRD pattern of the spent sample after 20 and 9 hours on stream indicate the bulk structure of the molybdenum dioxide catalyst appears to experience slight changes with increasing time on stream, which may be related to the changes observed in the performance. Thus, as time passes, the amount of molybdenum dioxide in the sample decreases and, consequently, the catalytic activity toward the partial oxidation also decreases. At the same time, the concentration of gaseous oxygen in the feed stream is large enough to enhance the complete oxidation of the fuel to $CO_2$ and $H_2O$. This change in the reaction selectivity can be explained in terms of a shift in the reaction mechanism from the one proposed by Mars-van Krevelen to the one formulated by Eley-Rideal, which is based on the direct reaction between the adsorbed oxygen and the hydrocarbon existing in the gas phase.

Figure 4B:
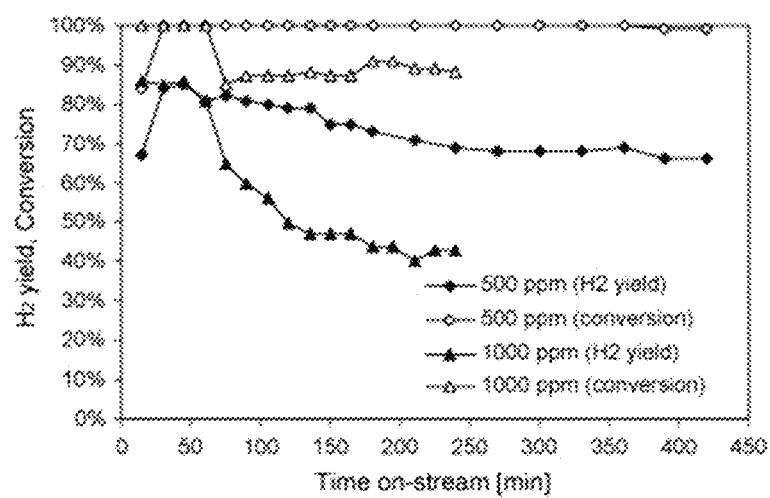
FIG. 4B shows the catalytic performance of $MoO_2$ at different thiophene concentrations.

The molybdenum dioxide catalyst was also tested for sulfur tolerance using thiophene as a sulfur model compound. Two different concentrations of thiophene (500 ppm and 1000 ppm) were employed in this test, performed under the same conditions at which the catalyst exhibited the longest stability (O/C=0.72, WHSV=0.6 $h^{-1}$ and T=700° C.). FIG. 4B shows the $H_2$ yield and the conversion as a function of the time on stream at the concentrations of thiophene mentioned above.

As observed, a concentration of 500 ppm thiophene appears to partially affect the $H_2$ yield, which declined by 20%, while the conversion remained practically constant after 7 h on stream. Instead, using a concentration of 1000 ppm of thiophene, the $H_2$ yield decreased from 86% to 43%, as the conversion also diminished from 100% to 88% after only 4 h on stream. The drop in the catalyst performance can be attributed to the progressive reduction in the number of sites available for the adsorption of the fuel as a result of the increased sulfur concentration on the catalyst surface. At 500 ppm, the adsorption of sulfur compounds appears to be relatively slow and thus no significant effect was detected on the catalytic performance of $MoO_2$ after 7 h on stream. However, at 1000 ppm, the deactivation caused by sulfur adsorption significantly affects the catalyst performance.

Figure 5:
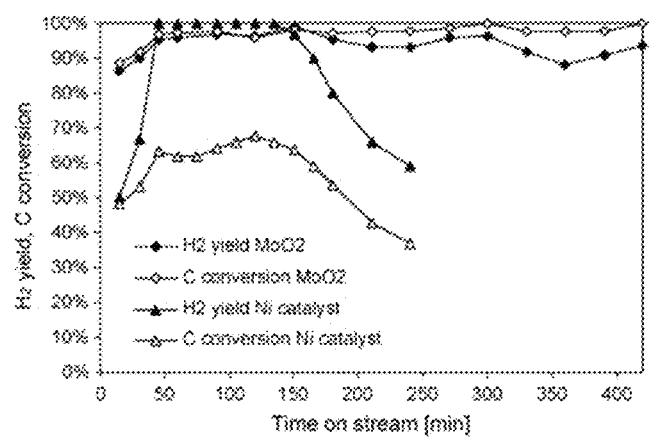
FIG. 5 shows a comparison between the performances of $MoO_2$ and a nickel catalyst for the partial oxidation of premium gasoline.

To measure the resilience of $MoO_2$ to deactivation caused by coking, the catalyst was tested using premium gasoline as fuel, with a content of aromatics of approximately 37%. Aromatic compounds are considered to be coking-precursors and therefore, large rates of coking-formation can be expected. The resulting performance was compared to that obtained using a nickel catalyst that has been found to be active for gasoline reforming. The operating conditions for this test were the same as ones used in the previous section (O/C=0.72, WHSV=0.6 h-1 and T=700° C.). The results of this comparison are displayed in FIG. 5.

As observed, after 7 h on stream, the catalytic performance exhibited by $MoO_2$ was fairly stable, obtaining a $H_2$ yield of 94% and a conversion of 100%. The nickel catalyst started with a $H_2$ yield of 100% and a conversion of 68%. However, these values diminished to 59% and 37% after 4 h on stream, respectively. The low conversion obtained with the Ni catalyst is the direct result of coke formation, which eventually plugged the reactor and significantly reduced the catalytic performance.

Reforming n-Dodecane

A limited number of studies have been conducted using $MoO_2$ as catalytic material for reforming processes. Such studies were carried out using commercial $MoO_2$, with particle sizes in the range of a few micrometers and BET surface areas lower than 10 m2/g. By utilizing $MoO_2$ nanoparticles (MDNPs), it is possible to significantly increase the total reactive surface area per gram and thus achieve reforming processes with higher efficiency levels. Herein, we analyze the catalytic performance of MDNPs toward the partial oxidation of a Jet-A fuel surrogate, which simplifies the complexity arising from the different types of hydrocarbons forming jet fuels. For Jet-A, the number of carbon atoms typically lies between 8 and 16. In this particular study, we used n-dodecane ($C_{12}H_{26}$) as fuel surrogate, given that paraffinic hydrocarbons constitute the most abundant type of compounds present in Jet-A fuels.

MDNPs were synthesized by reduction in solution phase of a molybdenum precursor, as described elsewhere. The molybdenum source used in this work was molybdenum trioxide powder ($MoO_3$) purchased from American Elements. A 1:3 volume ratio of ethylene glycol to distilled water was added to 0.3 g of $MoO_3$ powder in a 45 ml Teflon-lined general purpose vessel (Parr Instrument Company), which was subsequently sealed and heated to 180° C. for 12 h. The liquid ratio 1:3 was chosen because it was found to yield directly pure $MoO_2$, without the need for any post-synthesis reduction. After cooling, the dark colored $MoO_2$ was filtered out of the solution and air dried at 100° C. MDNPs thus prepared were characterized by X-ray diffraction (XRD), transmission electron microscopy (TEM), and BET nitrogen adsorption. In addition, the catalytic performance of our home-made MDNPs was compared to that obtained with commercially available low-surface area $MoO_2$.

BET surface area measurements were carried out using a Coulter SA-3100 automated characterization machine and previous degassing of the sample under vacuum at 513 K during 30 minutes. The morphology of the powder samples was examined using both SEM (FEI Sirion operated at 15 kV) and TEM (Philips CM-200 operated at 200 kV). X-ray diffraction patterns were obtained using the Bragg-Brentano optical configuration in a Philips diffractometer with Co Kα radiation and Fe filter.

Figure 6:
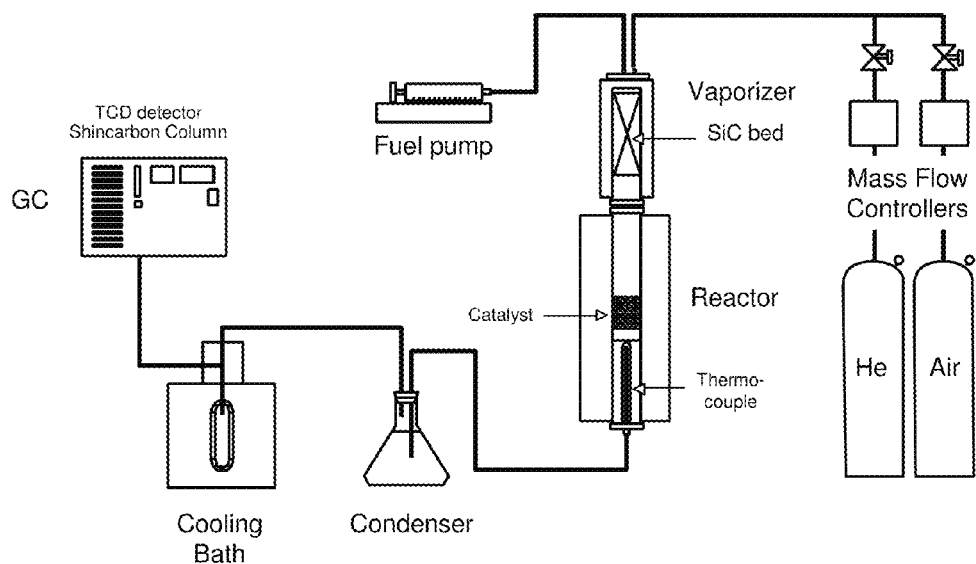
FIG. 6 shows an experimental setup for catalytic activity measurements.

FIG. 6 shows a schematic diagram of the experimental setup employed to measure the activity of the catalytic materials under partial oxidation conditions. The catalyst samples (either home-made MDNPs or commercial $MoO_2$ from Alfa Aesar) were supported by a quartz wool plug placed inside a 12 mm fixed-bed tubular (quartz) reactor. No catalyst pretreatment was applied prior to the activity tests. The liquid feed, consisting only of n-dodecane, was fed into a furnace at 500° C., where it was vaporized and mixed with air, employed as oxygen source. A silicon carbide bed inside this furnace was used to enhance the mixing of the reactants. A calibrated syringe pump and a mass flow controller allowed the control of the flow rates of liquid fuel and air, respectively. The exit stream was cooled down to 5° C. to separate water, non-reacted fuel, and other possible condensable products from the gas product. The composition of the dry off-gas was monitored using an SRI chromatograph with a TCD detector and a Shincarbon packed column to determine the concentrations of $H_2$, CO, $CO_2$, and $CH_4$. Previous to analysis, the spent samples were first cooled down to room temperature under helium inside the reactor.

The catalytic performance was analyzed in terms of $H_2$ yield, CO yield, and conversion. In this work, the hydrogen yield was defined as the ratio between the hydrogen produced and the one fed with the fuel. Likewise, CO yield was estimated as the ratio between the carbon monoxide in the off-gas and the total amount of carbon in the fuel. Finally, the conversion was calculated as the ration between the total amount of carbon-containing compounds in the gas product, i.e., CO, $CO_2$ and $CH_4$, and the total amount of carbon in the fuel.

Figure 7:
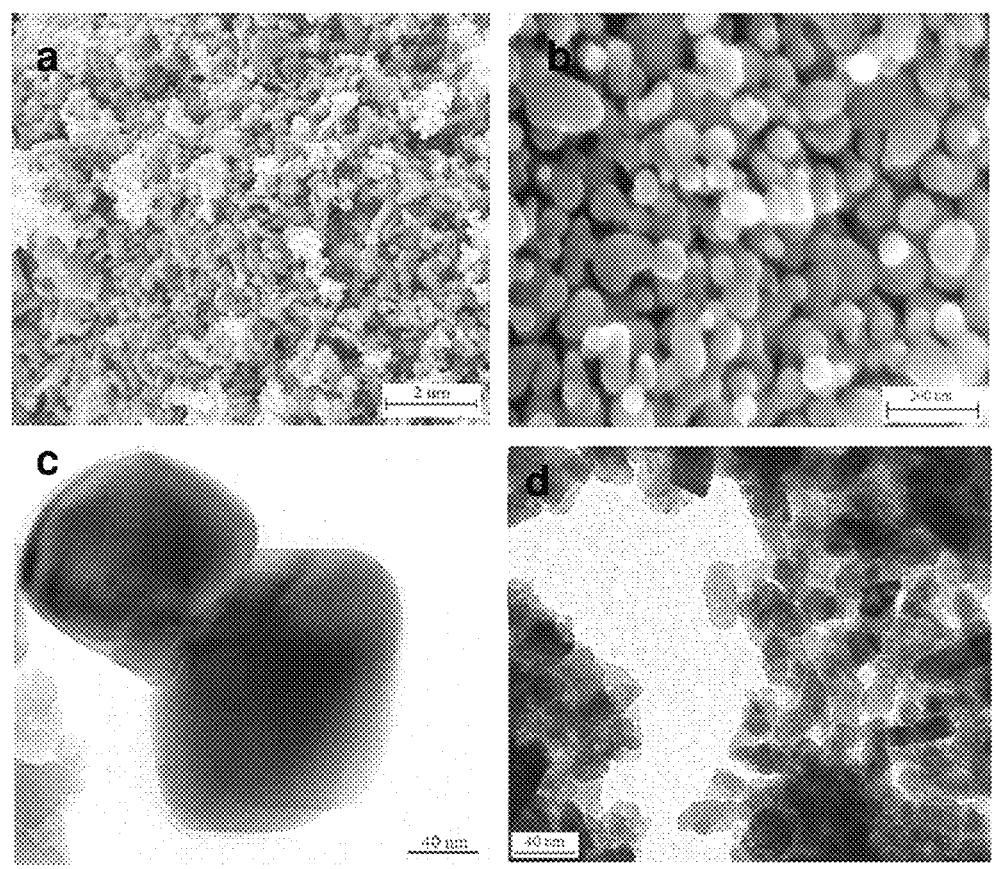
FIG. 7 shows SEM and TEM images of commercial $MoO_2$ (a and c) and MDNPs (b and d).

The BET surface areas determined for commercial $MoO_2$ and home-made MDNPs were 4 and 48 $m^2/g$, respectively. The diffractograms of these samples indicate two intense peaks at 2θ=30.5° and 44.0°, which are characteristic of the molybdenum dioxide phase. As expected, the peaks obtained in the pattern of MDNPs were broader than those detected in the pattern of commercial $MoO_2$. This observation is in agreement with the difference in surface area obtained from BET measurements and the smaller particle size of the MDNPs observed in SEM and TEM images (see FIG. 7).

Commercial $MoO_2$ appears to be formed by small particles of about 100 nm forming larger agglomerates of a few microns. The shape of these particles is not uniform and some of them look like rounded grains whereas others exhibit rod-like shapes. Instead, MDNPs display a more uniform morphology with spherical grains of approximately 40 nm, which also form larger micron-sized agglomerates. Considering only particle size, the expected ratio between surface areas is 100/40; however, BET measurements indicate a ratio of 48/4, which can be explained by considering differences in the porous structures. Thus, MDNPs not only show a smaller particle size but also they seem to possess a pore volume larger than that of commercial $MoO_2$ particles.

To investigate the catalytic activity of MDNPs toward the partial oxidation of n-dodecane, an activity test was conducted at 850° C. and 1 atm, with a weight hourly space velocity WHSV of 1.1 $h^{-1}$ and an $O_2$/C ratio of 0.5. The process can be described as shown below:

$$C_{12}H_{26} + 6O_2 \rightarrow 12CO + 13H_2$$

Figure 8:
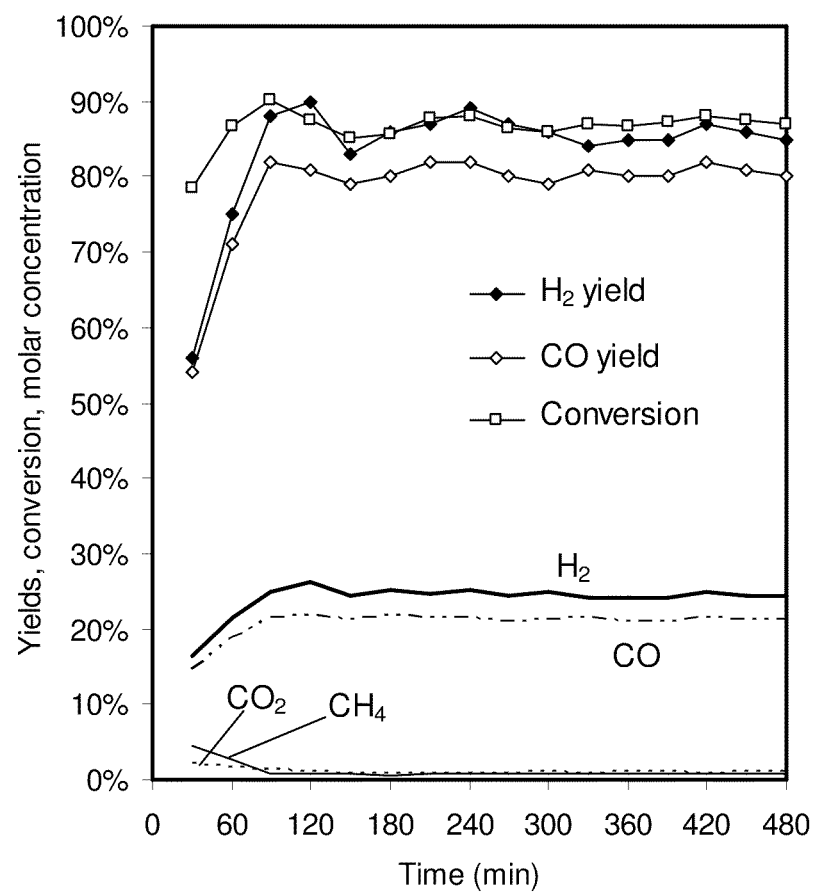
FIG. 8 shows catalytic activity of MDNPs.

The operating temperature was chosen to prevent carbon formation since the reverse Boudouard reaction is favored by thermodynamics at such temperature. Additionally, the temperature selected is high enough to minimize kinetic limitations. The $O_2/C$ ratio was set to 0.5 on the basis of our thermodynamic calculations, which show that ratios lower than 0.5 promote carbon formation in the catalytic material whereas ratios higher than 0.5 lead to a raise in the concentrations of $CO_2$ and $H_2O$, as a result of the full oxidation of the fuel. FIG. 8 shows the time-evolution of the catalytic performance of MDNPs under the specified operating conditions. As seen, the process takes about one hour to reach steady state conditions, point at which the $H_2$ yield, CO yield and conversion become approximately 85%, 85% and 80%, respectively. As expected from the stoichiometry of the reaction, an $O_2/C$ ratio of 0.5 leads to a small concentration of $CO_2$ whereas the concentrations of $H_2$ and CO attain values of about 25% and 20%, respectively. The reduced concentration of $CH_4$ suggests that the thermal cracking of the fuel was taking place at low rates.

Figure 9:
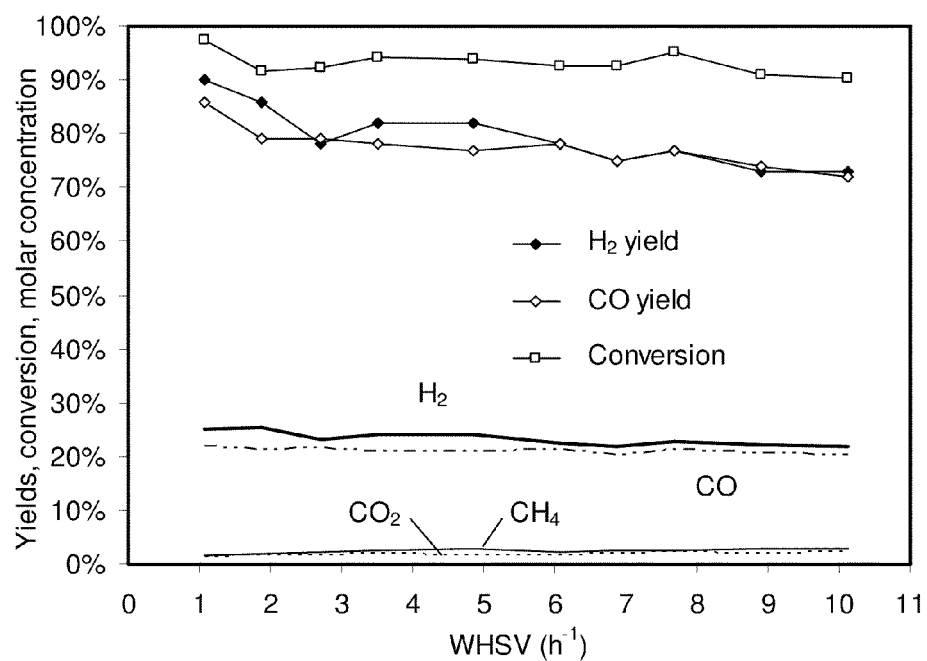
FIG. 9 shows the effect of WHSV on the catalytic activity of MDNPs.

FIG. 9 shows the effect of the space velocity WHSV on the catalytic performance of home-made MDNPs. The operating conditions chosen for this test were 850° C., 1 atm, and an $O_2/C$ ratio of 0.5. The WHSV range considered was 1 to 10 $h^{-1}$. As noticed, the conversion decreased from 97% to 91% as the WHSV increased from 1 to 10 $h^{-1}$. The $H_2$ yield and the CO yield gradually decreased from 90% to 73% and from 88% to 72%, respectively whereas the concentrations of $H_2$, CO, $CO_2$ and $CH_4$ appeared not to be significantly affected by the raise in the WHSV, which suggests that no changes took place in the mechanism of reaction.

Figure 10:
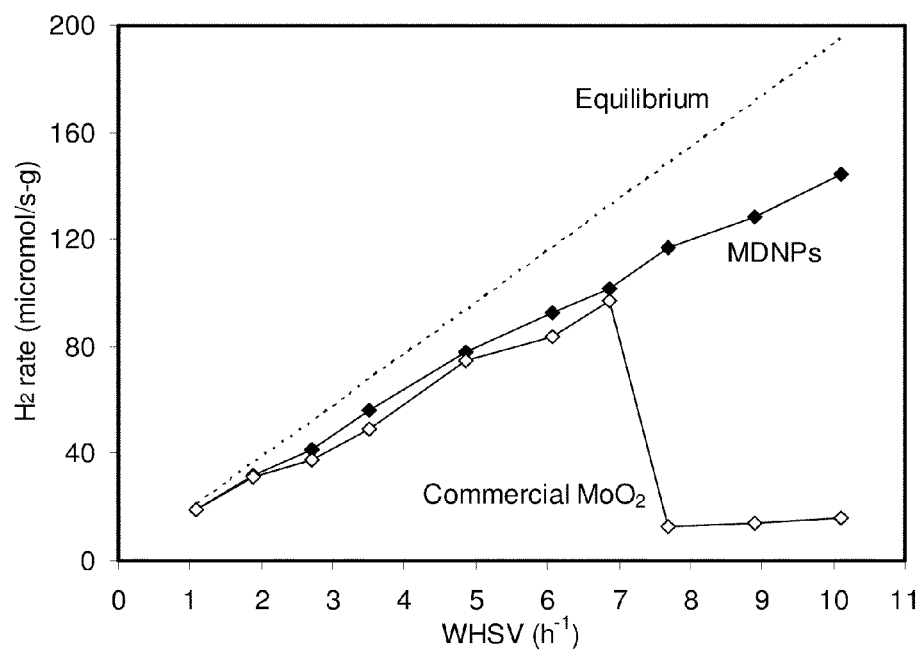
FIG. 10 shows a comparison of the catalytic activity of commercial $MoO_2$ versus MDNPs.

FIG. 10 is particularly important because it allows comparing the effect of the WHSV on the catalytic performance of both MDNPs and commercial $MoO_2$ particles. The $H_2$ production rates at equilibrium conditions estimated from thermodynamic calculations were included as reference for comparison purposes. As seen, the $H_2$ production rates for both catalysts were similar to each other, displaying a linear increase as the WHSV was raised from 1 to 7 $h^{-1}$; however, those obtained for the MDNPs appear to be a bit closer to the equilibrium values. However, at WHSVs above 7 $h^{-1}$, the difference between the samples in terms of catalytic activity becomes significant. This increasing difference can be attributed to either a change in the mechanism of reaction of the deactivation of the commercial $MoO_2$ sample. The activity of the commercial sample exhibits a significant drop in the $H_2$ production rate as the WHSV becomes larger than 7 $h^{-1}$ while MDNPs shows a continuous increase in the $H_2$ production rates.

In order to investigate the cause of the difference between the performances of the catalytic materials at large WHSVs, the spent catalyst samples were examined using TEM and SEM, and the images obtained are shown in FIG. 11. As observed, SEM micrographs indicate significant differences in terms of morphology between the catalyst samples. Thus, the spent commercial sample (FIG. 11a) displays a totally different particle shape, which is now similar to that of amorphous agglomerates of larger size. Instead, the shape and particle size of the MDNPs (FIG. 11b) remain practically unaltered by the reforming environment, which suggests the apparent absence of sintering effects on the MDNPs. TEM images confirm these observations and, additionally, show the encapsulation of the commercial $MoO_2$ particles (FIG. 11c) as a result of the formation of ring-like structures surrounding such particles. This behavior was not exhibited by the MDNPS (FIG. 11d). The electron diffraction patterns of both samples shown in FIG. 11 agree with the patterns obtained from the XRD analysis (data not shown) and indicate the presence of a mixture of Mo dioxide and Mo carbide in the bulk of the spent commercial sample and the existence of only the carbide phase in the spent MDNPs, which is favored by thermodynamics.

Figure 12A:
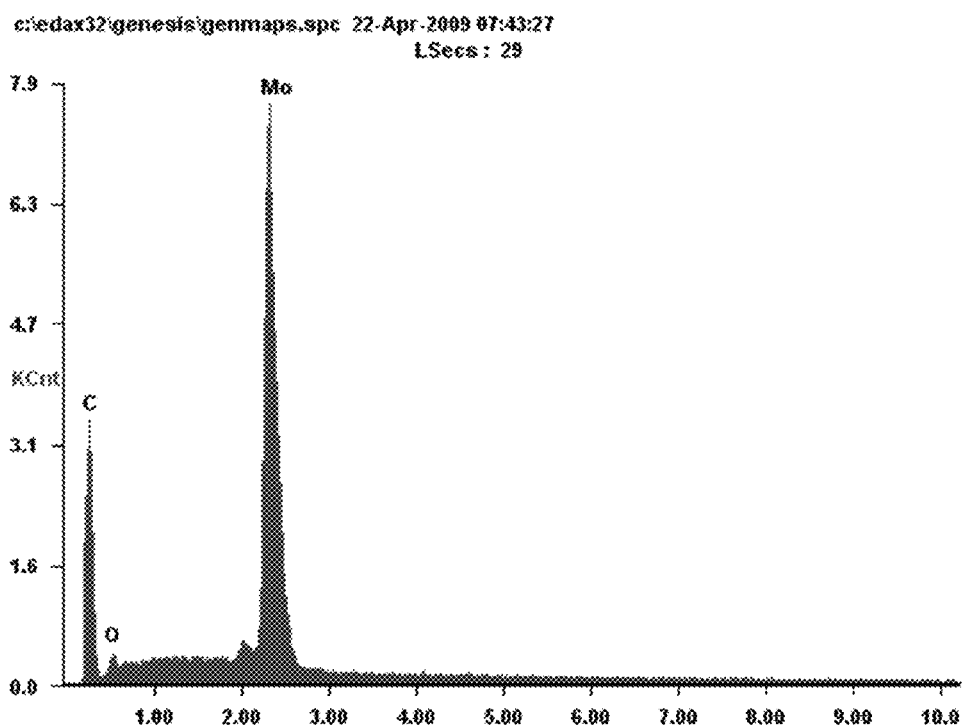
FIG. 12 shows EDX spectra of spent samples of commercial $MoO_2$ (a) and MDNPs (b).
Figure 12B:
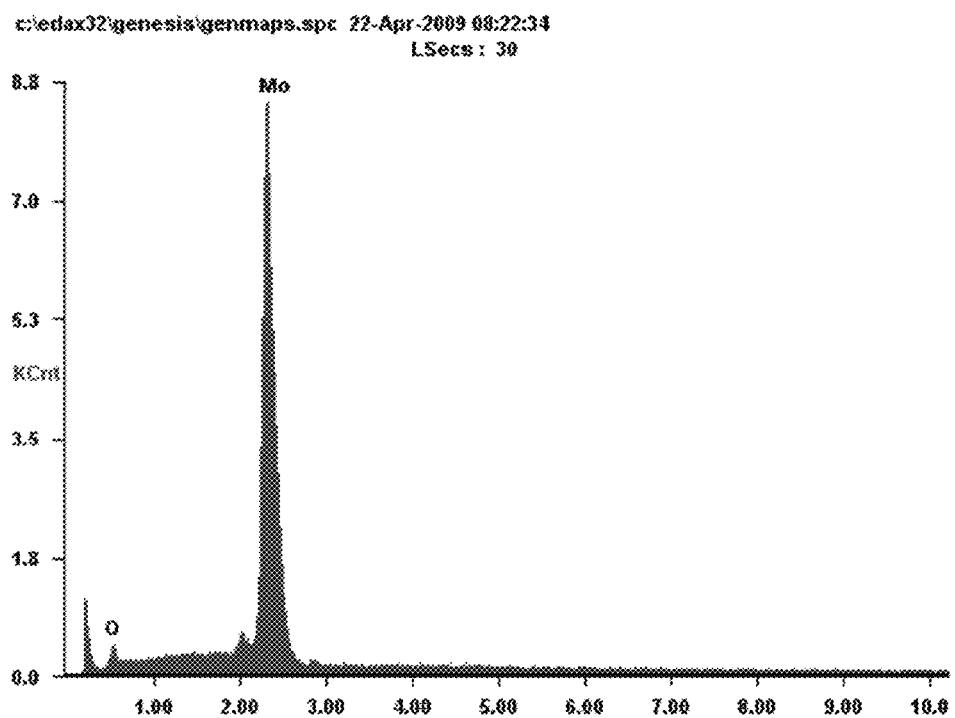
Figure 13:
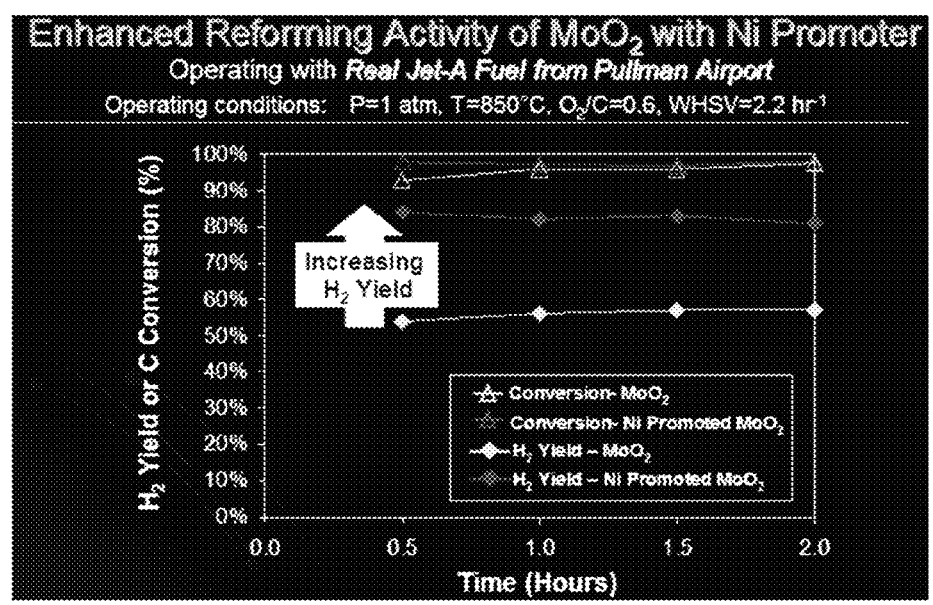
FIG. 13 shows the catalytic activity of Ni doped $MoO_2$ and pure $MoO_2$ particles for the partial oxidation reaction of real jet-A fuel at 850° C., oxygen-to-carbon ratio of 0.6 and weight-hourly-space-velocity (WHSV) of 2.2 $h^{-1}$.

The outer region of the spent samples was analyzed using a more surface sensitive technique such as EDX. As seen in FIG. 12, the spectrum of the commercial sample exhibits three major peaks: one tall peak associated to the presence of carbon, another attributed to oxygen, and a third one assigned to molybdenum. As to the MDNPs, their EDX spectrum shows the same number of peaks although with some differences in the relative intensity. Thus, the carbon peak appears much smaller that than detected for the commercial sample whereas the oxygen and molybdenum peaks display the same relative intensity than those found for the commercial sample.

As mentioned earlier, the partial oxidation of liquid hydrocarbons over $MoO_2$ catalysts appears to follow the Mars-van Krevelen mechanism of reaction, according to which, the hydrocarbon molecules are first decomposed into hydrogen and smaller carbon-containing fragments. The next stage in the mechanism involves the insertion of oxygen atoms provided by the lattice structure of the metal oxide, which creates vacancies that are replenished with gas phase oxygen. In heterogeneous catalysis, the rates of reaction are significantly affected by the number of available active sites, which becomes larger as the surface area of the catalyst is increased. Thus, the high stability displayed by MDNPs can be then attributed to the existence of enough active sites available on their surface. Given that the electron diffraction and XRD analysis showed only Mo carbide in the bulk, then the mechanism of reaction may involve the participation of only few layers of oxide, which could not be detected due to the sensitivity of such techniques. However, the presence of Mo oxide in the outer region of the MDNPs is supported by the oxygen peak found in the EDX spectrum. The absence of significant sintering, as indicated by SEM and TEM images, leads to conclusion that the MDNPs transformed into actually Mo carbide nanoparticles whose surface contains enough active sites (provided by the Mo dioxide phase) to sustain the mechanism of reaction even at high WHSVs.

A different behavior was observed for commercial $MoO_2$ particles. At WHSVs below 7 $h^{-1}$, the performance was similar to that of MDNPs due to the presence of available active sites on the surface of the particles. However, at ratios above 7 $h^{-1}$, the deficit of active sites leads to a change in the dominant mechanism of reaction. Thus, the reaction rates of thermal cracking and gas phase oxidation become larger than those of the Mars-van Krevelen mechanism. The thermal cracking enhances the formation of methane and elementary carbon whereas the gas phase oxidation leads to the formation of carbon oxides. This is in agreement with the morphology observed with SEM and the encapsulation of particles detected with TEM. The ring-like structures are then formed by the carbon produced by the thermal cracking of the fuel, which appears to be in accordance with the significant height of the carbon peak observed in the EDX spectrum of this sample. The particle encapsulation caused by the excess carbon prevents the interaction of the hydrocarbon molecules with the active sites located on the catalyst surface and, as a result, the catalyst performance is expected to decline. In addition, the carbon ring-like structures may prevent the diffusion of oxygen from the bulk structure of the particles into the gas phase, which can explain the delay observed in the phase transition dioxide-to-carbide and detected with electron diffraction and XRD.

In summary, the present examples demonstrate that MDNPs possess high catalytic activity for the production of syngas to be used in fuel cell applications via the partial oxidation of a Jet-A fuel surrogate. The coking resistance and sulfur tolerance displayed by Mo dioxide as well as its electron conductivity make this catalyst unique and suitable for the development of alternative anode catalytic materials for direct hydrocarbon SOFCs.

A commercial $MoO_2$ catalyst was tested for the partial oxidation of biodiesel with an estimated chemical formal of $C_{18.6}H_{39.0}O_{2.4}$ obtained from Boeing (see FIG. 14 (A)). This is the same biodiesel used by Virgin Atlantic Airlines for successfully flying a Boeing 747 between London and Amsterdam in 2008. The performance of $MoO_2$ was compared to that obtained using a nickel catalyst. The operating conditions for this test were: O/C=1.0 (stoichiometric ratio), WHSV=1.9 $h^{-1}$ and T=850° C. As shown in FIG. 14 (B), even after 24 h on stream, the catalytic performance exhibited by $MoO_2$ was fairly stable, obtaining a hydrogen yield of ~60% and a ~100% carbon conversion. FIG. 14 (C) shows an energy dispersive X-ray spectroscopy (EDX) data and SEM image of $MoO_2$ after testing it with the biodiesel according to FIG. 14 (B) for 24 h. The EDX data provides the elemental analysis of the spent sample. According to FIG. 14 (C), no significant coke formation was detected from the spent $MoO_2$ catalysts. For comparison, the Ni catalyst started with a hydrogen yield of 75% and a conversion of 79%. However, these values diminished to 45% and 42% after 4 h on stream, respectively. The low conversion obtained with the Ni catalyst is the direct result of coke formation, which eventually plugged the reactor. This example clearly shows that a $MoO_2$ catalyst has an exceptionally high coke resistance during the partial oxidation of oxygenated heavy hydrocarbon. Furthermore, when 10 wt % Ni is wet-impregnated on $MoO_2$, its $H_2$ yield was increased compared to that of pure $MoO_2$ while maintaining the carbon conversion at 100%. This result indicates that improving the metallic property of $MoO_2$ leads to its improved selectivity for high $H_2$ yield. However, it eventually deactivates due to coking because a large Ni ensemble provides a site for coke formation. As a part of this invention, the metallic property of $MoO_2$ will be increased without creating a large metallic ensemble site on its surface by directly modifying its metal-metal bond distance using $RuO_2$, other metal oxides and/or metals as a doping material.

Particular embodiments are described in more detail in the following numbered paragraphs:

1. A composition comprising:
    a catalyst material comprising molybdenum dioxide having an average particle size from about 2 nm to about 1,000 nm; and
    a substrate, wherein the molybdenum dioxide nanoparticles are substantially immobilized on the substrate.
2. The composition of paragraph 1 wherein the molybdenum dioxide nanoparticles have an average particle size less than about 500 nm.
3. The composition of paragraph 1 wherein the molybdenum dioxide nanoparticles have an average particle size less than about 200 nm.
4. The composition of paragraph 1 wherein the substrate is selected from the group consisting of zeolite, $SiO_2$, $CeO_2$, $ZrO_2$, and $CeZrO_2$.
5. An anode for use in a fuel cell comprising the composition of paragraph 1.
6. A fuel cell comprising the anode of paragraph 5.
7. A fuel cell comprising:
    a cathode;
    an anode comprising a catalyst material including molybdenum dioxide nanoparticles;
    and a matrix material; and
    an electrolyte disposed between said cathode and said anode.
8. The fuel cell of paragraph 7 wherein the molybdenum dioxide nanoparticles are substantially immobilized on the matrix material.
9. The fuel cell of paragraph 8 wherein said matrix material is a ceramic.
10. The fuel cell of paragraph 8 wherein said matrix material includes at least one of yttrium stabilized zirconia and samarium domed ceria.
11. The fuel cell of paragraph 7 wherein said catalyst material have an average particle size in the range of about 1 to about 200 nanometers.
12. The fuel cell of paragraph 7 wherein said catalyst material have an average particle size in the range of about 200 to about 1000 nanometers.
13. The fuel cell of paragraph 7 wherein said catalyst material has a surface area of at least about 10 square meters per gram.
14. The fuel cell of paragraph 7 wherein said catalyst material has a surface area of at least about 50 square meters per gram.
15. The fuel cell of paragraph 7 wherein said catalyst material have a surface area of at least about 100 square meters per gram.
16. The fuel cell of paragraph 7 wherein said electrolyte is formed from a solid oxide.
17. A solid oxide fuel cell comprising:
    a cathode formed from a first ceramic material;
    an anode comprising catalyst material comprising molybdenum dioxide nanoparticles carried by a second ceramic material, said catalyst material having an average particle size of less than about 1000 nanometers; and
    an electrolyte between said cathode and said anode, said electrolyte being formed from a third ceramic material.
18. The solid oxide fuel cell of paragraph 17 wherein said second and third ceramic materials are the same.
19. The solid oxide fuel cell of paragraph 17 wherein said catalyst material have a surface area of at least about 100 square meters per gram.
20. A method for powering an external load circuit comprising the steps of:
    providing a solid oxide fuel cell comprising an anode, a cathode and an electrolyte, said anode comprising catalyst material;
    electrically coupling said anode and said cathode to said external load circuit;
    supplying a hydrocarbon to said anode; and
    supplying an oxidant to said cathode.
21. The method of paragraph 20 wherein said catalyst material have an average particle size in the range of about 1 to about 200 nanometers.
22. The method of paragraph 20 wherein said catalyst material have a surface area of at least about 10 square meters per gram.
23. The method of paragraph 20 wherein said catalyst material have a surface area of at least about 50 square meters per gram.
24. The method of paragraph 20 wherein said catalyst material have a surface area of at least about 100 square meters per gram.
25. The method of paragraph 20 wherein said hydrocarbon is a petroleum-based fuel.

26. The method of paragraph 20 wherein said hydrocarbon is Jet-A jet fuel.

Although the invention has been described with respect to specific embodiments and examples, it will be readily appreciated by those skilled in the art that modifications and adaptations of the invention are possible without deviation from the spirit and scope of the invention. Accordingly, the scope of the present invention is limited only by the following claims.

What is claimed is:

1. A fuel cell comprising:
a cathode;
an anode comprising molybdenum dioxide ($MoO_2$) nanoparticles, wherein the molybdenum dioxide ($MoO_2$) nanoparticles are the only anode-active and catalytically-active component present in the anode; and
an electrolyte disposed between said cathode and said anode.

2. The fuel cell of claim 1, wherein the molybdenum dioxide nanoparticles are substantially immobilized on a matrix material.

3. The fuel cell of claim 2, wherein the matrix material is a ceramic.

4. The fuel cell of claim 2, wherein the matrix material includes at least one of yttrium stabilized zirconia and samarium domed ceria.

5. The fuel cell of claim 1, wherein said molybdenum dioxide ($MoO_2$) nanoparticles have an average particle size in the range of about 1 to about 200 nanometers.

6. The fuel cell of claim 2, wherein said molybdenum dioxide ($MoO_2$) nanoparticles have an average particle size in the range of about 1 to about 200 nanometers.

7. The fuel cell of claim 1, wherein said molybdenum dioxide ($MoO_2$) nanoparticles have an average particle size in the range of about 200 to about 1000 nanometers.

8. The fuel cell of claim 2, wherein said molybdenum dioxide ($MoO_2$) nanoparticles have an average particle size in the range of about 200 to about 1000 nanometers.

9. The fuel cell of claim 1, wherein said molybdenum dioxide ($MoO_2$) nanoparticles have a surface area of at least about 10 square meters per gram.

10. The fuel cell of claim 1, wherein said electrolyte is formed from a solid oxide.

11. The fuel cell of claim 1, wherein the molybdenum dioxide ($MoO_2$) nanoparticles are doped with another metal.

12. The fuel cell of claim 1, wherein the fuel cell is a solid oxide fuel cell.

13. A solid oxide fuel cell comprising:
a cathode formed from a first ceramic material;
an anode comprising molybdenum dioxide ($MoO_2$) nanoparticles, wherein the molybdenum dioxide ($MoO_2$) nanoparticles are a catalyst and have an average particle size of less than about 1000 nanometers; and
an electrolyte between said cathode and said anode, said electrolyte being formed from a second ceramic material, and
wherein the molybdenum dioxide ($MoO_2$) nanoparticles are deposited on the electrolyte.

14. A fuel cell comprising:
a cathode;
an anode comprising molybdenum dioxide ($MoO_2$) nanoparticles, wherein the molybdenum dioxide ($MoO_2$) nanoparticles are the only anode-active and catalytically-active component present in the anode;
an electrolyte disposed between said cathode and said anode; and
wherein the molybdenum dioxide ($MoO_2$) nanoparticles are doped with at least one dopant selected from the group of $SiO_2$, $TiO_2$, $SnO_2$, $CeO_2$, Co, Ni, Cu, Rh, Pd, Ag, Ir and Pd.

15. The fuel cell of claim 2, wherein the matrix material comprises a zeolite.

16. The fuel cell of claim 13, wherein the electrolyte comprises yttrium stabilized zirconia or samarium domed ceria.

17. The fuel cell of claim 13, wherein said molybdenum dioxide ($MoO_2$) nanoparticles have an average particle size in the range of about 1 to about 200 nanometers.

18. The fuel cell of claim 13, wherein said molybdenum dioxide ($MoO_2$) nanoparticles have an average particle size in the range of about 200 to about 1000 nanometers.

19. The fuel cell of claim 13, wherein said molybdenum dioxide ($MoO_2$) nanoparticles have a surface area of at least about 10 square meters per gram.

20. The fuel cell of claim 13, wherein the molybdenum dioxide ($MoO_2$) nanoparticles are doped with another metal.

21. A fuel cell comprising:
a cathode;
an anode consisting of molybdenum dioxide ($MoO_2$) nanoparticles; and
an electrolyte disposed between said cathode and said anode.

22. The fuel cell of claim 21, wherein the electrolyte comprises yttrium stabilized zirconia or samarium domed ceria.

23. The fuel cell of claim 21, wherein said molybdenum dioxide ($MoO_2$) nanoparticles have an average particle size in the range of about 1 to about 200 nanometers.

24. The fuel cell of claim 21, wherein said molybdenum dioxide ($MoO_2$) nanoparticles have an average particle size in the range of about 200 to about 1000 nanometers.

25. The fuel cell of claim 21, wherein said molybdenum dioxide ($MoO_2$) nanoparticles have a surface area of at least about 10 square meters per gram.

* * * * *